Aug. 14, 1923.
C. H. SCHURR
1,465,240
RING TYPE CUTTER AND METHOD OF ITS USE
Filed Nov. 11, 1919
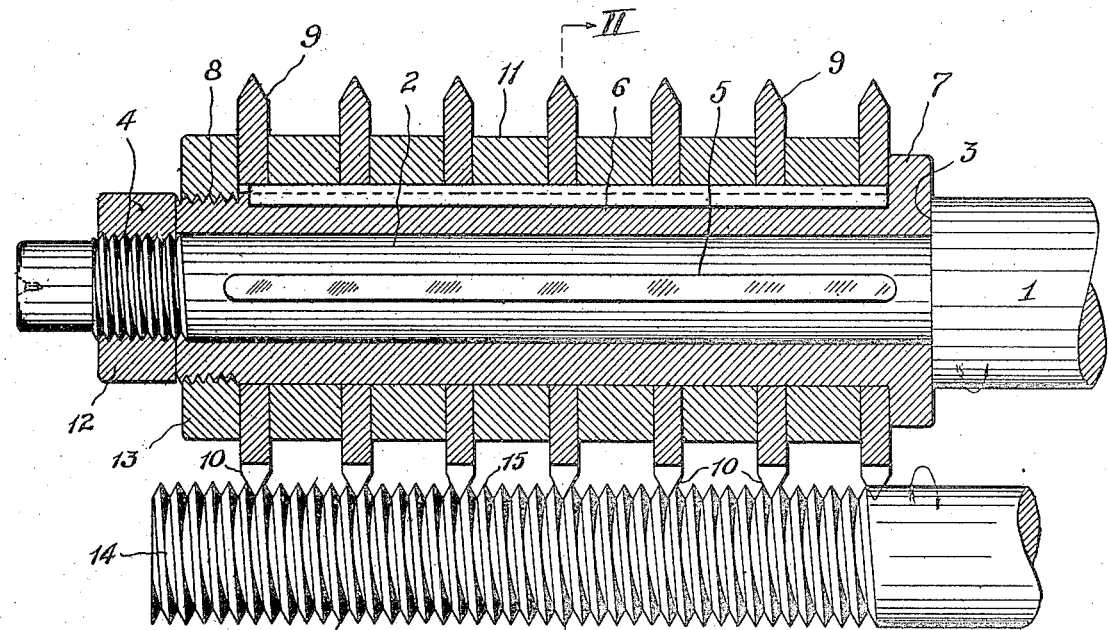
FIG. I.
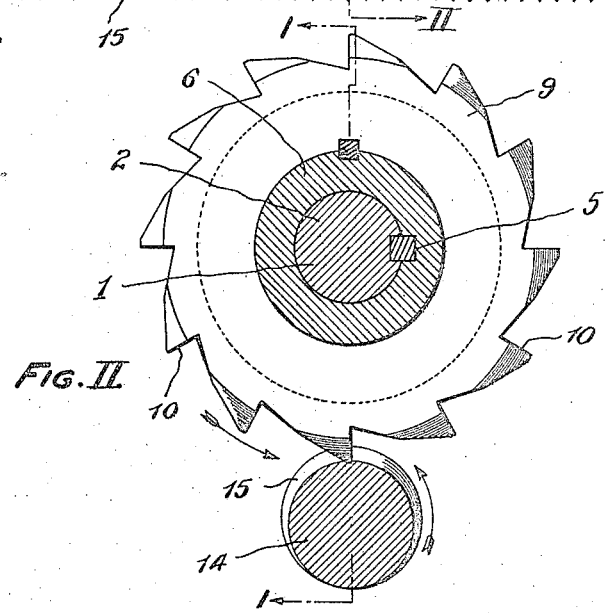
FIG. II.
INVENTOR:
CHARLES H. SCHURR
BY HIS ATTY Patented Aug. 14, 1923.

1,465,240

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

RING-TYPE CUTTER AND METHOD OF ITS USE.

Application filed November 11, 1919. Serial No. 337,206.

*To all whom it may concern:*

Be it known that I, CHARLES H. SCHURR, a citizen of the United States, residing at 3344 W. 98th St., in the city of Cleveland, county of Cuyahoga, and State of Ohio, have invented a new and useful Improvement in Ring-Type Cutters and Methods of Their Use, of which the following is a specification, the principle of the invention being herein explained, and the best mode in which I have contemplated applying that principle so as to distinguish it from other inventions.

My invention relates to a cutting tool and more particularly to a composite structure formed of a plurality of ring cutters definitely spaced apart; and incidentally my invention involves a new method of milling long threads.

The object of my invention is to achieve speed of operation and therefore a saving of time in cutting threads which are to be so long that a gang cutter is impracticable and a single cutter too slow.

Heretofore, very long threads had to be cut with what is known as a "single cutter" which of course had to be chased the full length of the thread. Obviously, such a cutter could cut any length of thread, but the operation was very slow. I am well aware that gang cutters are old, indeed, gang cutters of the ring type are not even new, witness E. J. Lees' Patent No. 1,202,-195. Gang cutters have previously been used for parallel work and were generally travelled at right angles to the work. In the prior use of gang cutters the cut made by any particular cutting edge was only once around before it interlapped with the commencement of the cut of the preceding edge. A gang cutter is of course more rapid in operation, but if each cutting edge is intended to cut only once around the blank the gang cutter is not feasible for long lengths of thread it being next to impossible to maintain the right pitch.

My invention comprehends the use of a gang tool composed of a series of ring type cutters spaced apart a distance greater than the pitch of the thread to be cut so that the relative axial travel between the blank and tool must be greater. The cutting rings being spaced a multiple of the pitch to be cut, must be travelled until the resultant cuts lap each other. The relative axial movement is to be more than that of multiple edged ring type cutters suitable for short lengths of thread, but is to be less than that of the single cutter. Each of the series of cutting elements or rings in a tool embodying my invention cuts several times around the blank until the finish of the cut by any particular ring merges with the commencement of the cut of the next preceding ring and thus produces a continuous helical cut about the axis of the blank.

I assert that a cutting tool embodying my invention will perform more work with the given amount of power. It also has the advantages of economy of manufacture, speed and almost limitless adjustability.

Adverting to the drawing:—

Figure I is an axial section on the line I—I of Fig. II of a tool embodying my invention, and mounted upon a spindle in parallelism with which is a work piece with a thread cut thereon.

Figure II is a vertical cross section on the line II—II of Fig. I through the middle of one of the cutting elements.

A spindle 1 is fashioned with a reduced shank 2 to form a shoulder 3. At another point the shank 2 is fashioned with screw threads 4. Keyed at 5 to the shank 2 is a sleeve 6 preferably provided with an end flange 7 in abutment with the shoulder 3. The opposite end of the sleeve is likewise provided with screw threads 8. Keyed in turn around the sleeve 6 are a plurality of ring cutters 9 having cutting edges 10. The cutters 9 are definitely spaced apart by means of spacer rings 11 and in fact spaced apart a distance such that their cutting edges 10 are further apart than one pitch of the thread which it is intended to cut. According to the exemplification of the drawing the cutting edges 10 are spaced apart a distance equal to six times the lead in a direction parallel to the axis of the cutter. As will be obvious, the spacer rings 11 could be integral with the cutting rings 9. A nut 12 holds the sleeve 6 in place upon the spindle and against its shoulder 3. A nut 13 holds the rings 9 and spacers 11 in place upon the sleeve 6 and against its flange 7.

A work piece 14 is shown fashioned with threads 15. As will be readily understood by those who are skilled in the art, in addition to the rotary movement required to be imparted to both the blank and the tool, there must be a relative movement between the two in a direction parallel to their axes which is the lead movement required to effect the desired pitch of the thread to be produced. Clearly, a single cutter would have to be traveled or chased along the full length of the thread. The use of a gang cutter would of course require less axial movement to complete a given length of thread, but gang cutters have proven impractical for long lengths of thread owing to the difficulty of properly setting up such a tool if very long and the greater difficulty of maintaining the right pitch or effecting accurate results. If gang cutters could be successfully made with enough cutting edges any length of thread might be cut with the cutting edges spaced apart only the distance of the pitch desired and accordingly, the axial movement could be limited to that distance, along the axis of the lead. But experience has proven this to be unsuccessful. My invention may be considered as a compromise between the two methods heretofore used, so that the relative axial movement is more than that of the limited lengths of gang cutters, but less than that necessitated by the use of a single cutter.

Each cutting edge 10 will travel along the axis a distance greater than one pitch of the thread to be cut so that each will cut more than once around, according to the exemplification six times around, until the end of its cut merges with the point of commencement of cut of the next preceding cutting edge 10 with reference to the direction of relative movement to be imparted.

By keying each of the cutters 9 to a detachable sleeve 7 the latter may be withdrawn from the shank 2 and thus enable another type of cutter to be quickly substituted without necessitating an immediate disassembly and rearrangement of the cutters 9 and spacer rings 11. By leaving the nut 13 tightly in place the particular relationship of the cutter 9 may be retained or for use elsewhere or subsequently.

I claim:—

1. A composite ring type cutter having a space between the centers of any two cutters greater than one pitch of the screw to be cut.

2. A ring type cutter composed of a plurality of units each unit being a complete single cutter, and these units being spaced apart so that the centers of the cutters are more than one pitch of the thread to be cut.

3. A tool of the character described comprising a plurality of cutting rings spaced apart a distance greater than the pitch of the thread to be cut.

4. The method of cutting a thread of predetermined pitch which consists in rotating a blank, rotating a cutter, bringing said parts into simultaneously operative engagement so as to cut at a plurality of points spaced apart further than the pitch of the thread which it is desired to produce, and imparting a relative axial movement for a distance in excess of the pitch of the thread.

5. The method of cutting a thread of predetermined pitch which consists in rotating a blank and a multiple edged tool in operative engagement simultaneously cutting at a plurality of points spaced apart further than the pitch of the thread which it is desired to produce, and effecting an axial movement of one of the parts for a distance greater than the pitch of the thread, whereby to make a series of cuts each extending more than once about the blank's axis and each of which merges into another.

6. The herein disclosed method of cutting a thread which consists in rotating a blank and causing a plurality of elements spaced a distance greater than the pitch of the thread to be produced and rotating on an axis parallel to the axis of the blank simultaneously to cut said blank while causing relative movement between said blank and said spaced cutting elements in line with the axis of one of them for a distance equal to the space between said elements.

7. A ring type cutter comprising the combination with a driving spindle, of a sleeve connected with said spindle, a plurality of ring cutters upon said sleeve and definitely spaced therealong, means for securing said cutters in position upon said sleeve, and means for securing said sleeve to said spindle.

8. A ring type cutter comprising the combination with a driving spindle provided with a shoulder, of a sleeve provided with a flange and keyed to said spindle, a plurality of ring cutters upon said sleeve, spacer devices between said cutters, means for tightening said cutters in position upon said sleeve and against its flange, and means for tightening said sleeve to said spindle and against its shoulder, whereby all the cutters may be removed as a unit along with said sleeve.

9. In a tool of the class described, the combination with a spindle, of a plurality of ring cutters secured to said spindle, and means for uniformly spacing apart said cutters each a distance greater than one pitch of the thread to be cut.

10. A ring type cutter comprising the combination with a spindle, of a sleeve fitting said spindle, a plurality of spaced ring cutters upon said sleeve, means for securing said cutters in position on said sleeve, and separate means for removably securing said sleeve on said spindle.

Signed by me, this 1st day of Nov., 1919.

CHARLES H. SCHURR.